(12) United States Patent
Patel

(10) Patent No.: US 11,729,629 B2
(45) Date of Patent: *Aug. 15, 2023

(54) TRANSMITTING TRAFFIC IN A SHARED FREQUENCY BANDWIDTH

(71) Applicant: ARRIS Enterprises LLC, Suwanee, GA (US)

(72) Inventor: Sandip C. Patel, San Jose, CA (US)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/751,750

(22) Filed: May 24, 2022

(65) Prior Publication Data

US 2022/0286865 A1 Sep. 8, 2022

Related U.S. Application Data

(63) Continuation of application No. 16/329,617, filed as application No. PCT/US2016/049273 on Aug. 29, 2016, now Pat. No. 11,368,851.

(51) Int. Cl.
*H04W 16/14* (2009.01)
*H04W 72/12* (2023.01)
(Continued)

(52) U.S. Cl.
CPC ....... *H04W 16/14* (2013.01); *H04W 72/1215* (2013.01); *H04W 72/569* (2023.01);
(Continued)

(58) Field of Classification Search
CPC ............. H04W 16/14; H04W 72/1215; H04W 72/1242; H04W 74/0816; H04W 84/12; H04W 74/0891
See application file for complete search history.

(56) References Cited

U.S. PATENT DOCUMENTS

| 11,368,851 B2* | 6/2022 | Patel | ................. H04W 74/0891 |
| 2005/0043046 A1* | 2/2005 | Lee | .................... H04W 36/0072 |
| | | | 455/502 |

(Continued)

FOREIGN PATENT DOCUMENTS

| WO | 2008/075316 | 6/2008 |
| WO | 2012/093349 | 7/2012 |

OTHER PUBLICATIONS

"On the impact of LTE-U on Wi-Fi performance", A. Babaei, J. Andreoli-Fang and B. Hamzeh, 2014 IEEE 25th Annual International Symposium on Personal, Indoor, and Mobile Radio Communication (PIMRC), Washington, DC, 2014, pp. 1621-1625.

(Continued)

*Primary Examiner* — Ajay Cattungal
(74) *Attorney, Agent, or Firm* — Steven Stupp; Stewart Wiener

(57) ABSTRACT

An electronic device that transmits traffic in a wireless network is described. During operation, the electronic device transmits, using a first transceiver, a first type of traffic in a shared frequency band that is unlicensed. Then, the first transceiver reserves time for transmitting a second type of traffic in the shared frequency band. The reserved time may be determined in response to a request to reserve the time from a second transceiver in the electronic device transmitting the second type of traffic in the shared frequency band. Next, the first transceiver permits, in the reserved time, transmission by the second transceiver of the second type of traffic in the shared frequency band. Furthermore, the first transceiver prevents transmission of the first type of traffic during the reserved time, thereby segregating the first type of traffic from the second type of traffic in the shared frequency band.

20 Claims, 7 Drawing Sheets

(51) Int. Cl.
*H04W 74/08* (2009.01)
*H04W 72/566* (2023.01)
*H04W 84/12* (2009.01)

(52) U.S. Cl.
CPC ... *H04W 74/0816* (2013.01); *H04W 74/0891* (2013.01); *H04W 84/12* (2013.01)

(56) References Cited

U.S. PATENT DOCUMENTS

| | | | | |
|---|---|---|---|---|
| 2012/0252377 A1* | 10/2012 | Wachi | ............ | H03K 17/002 |
| | | | | 455/83 |
| 2015/0003342 A1* | 1/2015 | Swaminathan | ..... | H04L 65/1095 |
| | | | | 370/329 |
| 2015/0063099 A1* | 3/2015 | Sadek | ............ | H04W 52/243 |
| | | | | 370/229 |
| 2015/0111581 A1 | 4/2015 | Yiu et al. | | |
| 2016/0174280 A1 | 6/2016 | Singh et al. | | |
| 2016/0278096 A1* | 9/2016 | Watfa | ............ | H04W 4/14 |
| 2017/0055193 A1* | 2/2017 | Mueck | ............ | H04W 16/14 |
| 2017/0093927 A1* | 3/2017 | Seetharaman | ........ | H04L 63/306 |
| 2019/0110310 A1* | 4/2019 | Obregon | ............ | H04W 72/541 |
| 2021/0289364 A1 | 9/2021 | Patel | | |

OTHER PUBLICATIONS

International Search Report and Written Opinion, International Application No. PCT/US2016/049273, dated Nov. 4, 2016.
Canadian Patent Appl. No. 3,066,492, Office Action, dated Mar. 4, 2020.
European Patent Appl. No. 16915349.1, Supplemental European Search Report, dated Mar. 9, 2020.
Examination Report, European Patent Appl. No. 16915349.1, dated Mar. 9, 2021.
Office Action, corresponding to Canadian Application No. 3,066,492, dated Apr. 8, 2021, 7 pgs.
"EP Office Action in corresponding application No. 16915349.1 dated Oct. 31, 2022, 6 pages".

* cited by examiner

TRANSMITTING TRAFFIC IN A SHARED FREQUENCY BANDWIDTH

CROSS REFERENCE TO RELATED APPLICATIONS

This application is a continuation of U.S. patent application Ser. No. 16/329,617, "Transmitting Traffic in a Shared Frequency Bandwidth," by Sandip C. Patel, filed on Feb. 28, 2019, which claims priority under 35 U.S.C. 371 to International Application No. PCT/US2016/049273, "Transmitting Traffic in a Shared Frequency Bandwidth," by Sandip C. Patel, filed on Aug. 29, 2016, the contents of both of which are herein incorporated by reference.

FIELD

The described embodiments relate to techniques for communicating information among electronic devices, and more particularly, the described embodiments relate to techniques for transmitting multiple types of wireless data traffic on a shared unlicensed frequency.

BACKGROUND

Many electronic devices are capable of wirelessly communicating with other electronic devices. For example, these electronic devices can include a networking subsystem that implements a network interface that is compatible with one or more wireless communication protocols. For example, the wireless communication protocols may include a cellular-telephone communication protocols and/or a non-cellular-telephone communication protocols. Cellular-telephone communication protocols may include: GSM, LTE, LTE Advanced (LTE-A), HSPA, 3GPP2 CDMA2000 (e.g., 1xRTT, 1xEV-DO, HRPD, eHRPD), etc. Moreover, the non-cellular-telephone communication protocols may include: an Institute of Electrical and Electronics Engineers (IEEE) 802.11 protocol (which is sometimes referred to as 'Wi-Fi'), IEEE 802.16 (which is sometimes referred to as 'WiMAX'), Bluetooth, etc. Typically, data transmission in a cellular-telephone protocol occurs in a licensed frequency band, while data transmission in non-cellular-telephone communication protocols often occurs in unlicensed frequency bands.

Recently, LTE-U has been proposed. This cellular-telephone technology is based on cellular-telephone communication protocols such as LTE. In LTE-U, data transmissions are to occur in an unlicensed frequency band. However, some Wi-Fi communication protocols also use these unlicensed frequency bands.

Because electronic devices that communicate using Wi-Fi in the unlicensed frequency bands are already widespread, LTE-U small cells that coexist with the Wi-Fi ecosystem are being used. However, because different LTE-U operators may occupy the same spectrum in the unlicensed frequency bands to provide data services to their users, unplanned and unmanaged deployment of LTE-U small cells may result in excessive radio-frequency interference with an existing Wi-Fi co-channel and/or LTE-U nodes in the vicinity that are associated with other operators.

Furthermore, in cellular-telephone communication links, electronic devices using a cellular-telephone communication protocol often compete for a common outgoing cellular-telephone communication link when attempting to transmit buffered data. Typically, to improve efficiency, the buffered data is scheduled on the egress side of the electronic device. Consequently, scheduling devices often require processing on the egress side in an electronic device prior to transmission of buffered data to select which of the queued traffic data packets is next in line for the outgoing transmission. However, such a schedule-based communication protocol is usually incompatible with contention-based communication protocols (such as those used with Wi-Fi).

SUMMARY

The described embodiments relate to an electronic device that transmits traffic in a wireless network. In particular, during operation, a first transceiver in the electronic device transmits a first type of traffic in a shared frequency band that is unlicensed. Then, the first transceiver reserves a time for transmitting a second type of traffic in the shared frequency band, where the reserved time is determined in response to a request to reserve time from a second transceiver in the electronic device transmitting the second type of traffic in the shared frequency band. Moreover, the first transceiver permits transmission, during the reserved time, by the second transceiver of the second type of traffic in the shared frequency band. Next, the first transceiver prevents transmission, during the reserved time, of the first type of traffic in order to segregate the first type of traffic from the second type of traffic in the shared frequency band.

Moreover, the first transceiver may receive a system information block (SiB) of data including timing of transmissions for the second type of traffic. Furthermore, the first transceiver may generate, based on the received SiB data, an offset in time of a periodicity of transmissions of the first type of traffic and the second type of traffic. Additionally, the first transceiver may synchronize, using the generated offset, the periodicity of transmission of the first type of traffic and the second type of traffic. Subsequently, the first transceiver and the second transceiver may perform synchronized transmissions of the first type of traffic and the second type of traffic in the shared frequency band.

In some embodiments, preventing transmission of the first type of traffic involves sending, prior to reserving the time in the shared frequency band, a request-to-send (RTS) packet in response to the request to reserve time, where the RTS packet data prevents transmissions of the first type of traffic by another device during the reserved time in the shared frequency band. Moreover, after sending the RTS packet, the first transceiver may receive a clear-to-send (CTS) data from the other device that confirms the reserve time is clear of transmissions of the first traffic type. Furthermore, the first transceiver may provide, to the second transceiver, confirmation of the reserved time via a communication link between the first transceiver and the second transceiver in response to reserving the reserved time. Note that the RTS packet may reserve up to five LTE beacon periods or 500 milliseconds of time in the shared frequency band.

Moreover, the first transceiver may receive, from the second transceiver, the request to reserve the time via a communication link between the first transceiver and the second transceiver. Furthermore, the communication link may be a local-area-network (LAN) link having a latency that is less than a predefined value. Additionally, the second transceiver may receive, after the transmission of the second type traffic in the shared frequency band, a confirmation in a licensed frequency band from another device that the second type of traffic was received.

Note that the first type of traffic may be compatible with an IEEE 802.11 communication protocol. Moreover, the second type of traffic may be compatible with Long Term Evolution (LTE).

In some embodiments, the second transceiver classifies the second type of traffic based upon a quality of service check of data in a packet data in the second type of traffic. Based on the classifications, the second transceiver may prioritize the second type of traffic for transmission, where Voice over Long Term Evolution (VoLTE) traffic is given a higher priority than other traffic.

Another embodiment provides a computer-program product for use with the electronic device. This computer-program product includes instructions for at least some of the operations performed by the electronic device. For example, the computer-program product may be executed by an interface circuit in the electronic device. Moreover, the computer-program product may correspond to a media access control (MAC) layer.

Another embodiment provides a method. This method includes at least some of the operations performed by the electronic device.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

Note that like reference numerals refer to corresponding parts throughout the drawings. Moreover, multiple instances of the same part are designated by a common prefix separated from an instance number by a dash.

DETAILED DESCRIPTION

Figure 1:
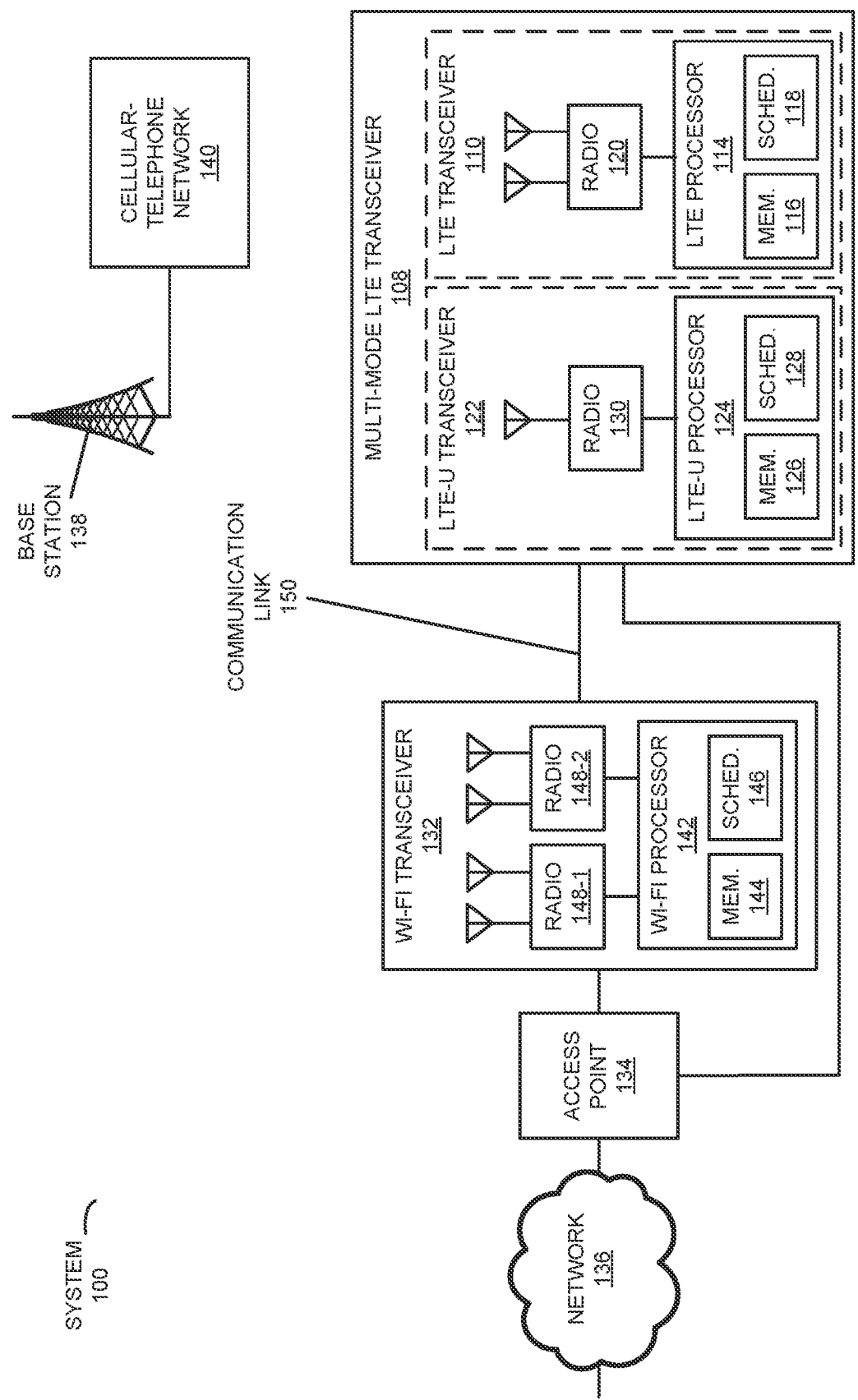
FIG. 1 provides a block diagram illustrating a system that communicates using Wi-Fi and LTE in accordance with some embodiments.

In order to facilitate transmission of traffic without interference using a schedule-based channel-access communication protocol and contention-based channel-access communication protocol in a shared frequency band that is unlicensed, an electronic device may reserve times for different transceivers. In particular, during operation the electronic device may transmit, using a Wi-Fi transceiver, a first type of traffic in the shared frequency band (such as traffic that is compatible with a Wi-Fi communication protocol). Then, the Wi-Fi transceiver may reserve time for transmitting a second type of traffic in the shared frequency band (such as traffic that is compatible with an LTE communication protocol). The reserved time may be determined in response to a request to reserve the time from an LTE transceiver in the electronic device transmitting the traffic that is compatible with an LTE communication protocol in the shared frequency band. Next, the Wi-Fi transceiver may permit, in the reserved time, transmission by the LTE transceiver of the traffic that is compatible with an LTE communication protocol in the shared frequency band. Furthermore, the Wi-Fi transceiver may prevent transmission of traffic that is compatible with a Wi-Fi communication protocol during the reserved time, thereby segregating the traffic that is compatible with a Wi-Fi communication protocol from the traffic that is compatible with an LTE communication protocol in the shared frequency band.

In some embodiments, the communication technique may allow communication protocols that use different channel-access techniques to transmit traffic in the shared frequency band without mutual interference. Consequently, the communication technique may improve the performance of the electronic device, which may improve the user experience and, thus, customer satisfaction.

While the communication technique may be used in conjunction with a wide variety of communication protocols and bands of frequencies, in the discussion that follows Wi-Fi and LTE-U in a 5 GHz unlicensed frequency band are used as illustrative examples.

LTE and Wi-Fi are different communication protocols. Typically, these communication protocols communicate frames or packets in different bands of frequencies (which may be continuous bands of frequencies or a set of different bands of non-overlapping frequencies that are separated by gaps). In Wi-Fi, channel access is based on carrier sense multiple access/collision detection (CSMA/CD) access. Moreover, in Wi-Fi, an access point and client stations usually vie for access to the shared channel based on the access category of the traffic. Note that equal access is usually used for the same access category.

In Wi-Fi, prior to initiating transmitting, every station waits for the shared channel to be idle for a defined period, which is called the 'inter-frame spacing.' If a Wi-Fi transceiver determines that the shared channel is busy when a station wants to send a frame or a packet, the station backs off the sending operation for a random time interval until the shared channel is clear.

In contrast, in LTE, a base station schedules sending operations of the mobile or portable electronic devices. In addition, in LTE there is usually a different idle mode for power saving and a fixed schedule for uplink and downlink transmissions, which is usually determined by eNodeB or eNB (which is sometimes referred to as a 'radio node').

In LTE-U (a proposed communication protocol that uses the LTE communication protocol in the unlicensed bands, e.g., 5 GHz) transmission approaches, an LTE transceiver senses when the shared channel is idle. For example, the LTE transceiver may determine if the received noise energy or power is larger than a threshold value relative to a calibrated noise floor. However, this LTE-U transmission technique is not always sufficiently reliable. In particular, because of the short inter-frame spacing between transmission of a Wi-Fi packet and the time for the Wi-Fi transceiver to acknowledge that the packet was received, the LTE-U transmission technique may not be able to guarantee that acknowledgements from the Wi-Fi transceiver will not be corrupted by transmissions from the LTE transceiver. Consequently, the inter-frame spacing can lead to the LTE-U transceiver mistakenly determining that the shared channel is idle.

Therefore, during the communication technique, in order to prevent packet transmissions from being corrupted during Wi-Fi communication, the LTE transceiver may have a reservation-message mechanism for sending messages between the Wi-Fi transceiver and the LTE transceiver to coordinate traffic transmissions in the unlicensed frequency band. Note that the Wi-Fi transceiver and the LTE transceiver may be collocated (e.g., within the same enclosure). Alternatively, the Wi-Fi transceiver and the LTE transceiver may not be collocated. For example, the Wi-Fi transceiver and the LTE transceiver may communicate via a fast or high data-rate and/or a low latency communication link between separate subsystems (such as an Ethernet communication link).

FIG. 1 presents an illustration of a block diagram of a system 100 that communicates using a Wi-Fi communication protocol and an LTE communication protocol in accordance with some embodiments. In particular, system 100 can communicate using Wi-Fi and LTE. This may include maintaining IEEE 802.3 at POE+ compliance and providing up to 25.5 W of power.

In particular, LTE transceivers 110 and 122 in a multi-mode LTE transceiver 108 may support MIMO 2×2 (which is used an as illustrative, but non-limiting, example) and communication via the LTE-U communication protocol. LTE transceiver 110 may include an LTE processor 114, with memory 116, a scheduler 118 and radio 120 for LTE, and LTE transceiver 122 may include an LTE-U processor 124, with memory 126, a scheduler 128 and radio 130 for LTE-U. Moreover, schedulers 118 and 128 may schedule packets that are transmitted uplink/downlink in a 2.6 GHz frequency band by LTE processor 114 and downlink in an unlicensed frequency band (such as 5 GHz) by the LTE-U processor 124. (While particular frequency bands are used as illustrations in this discussion, in other embodiments different licensed and/or unlicensed frequency bands may be used.) For example, LTE processor 114 may instruct LTE transceiver 110 in sending and receiving packet transmissions. Furthermore, LTE-U processor 124 may instruct LTE-U transceiver 122 in sending packet transmissions.

Note that Wi-Fi transceiver 132 may be coupled to network 136 (such as the Internet) via an access point 134. Alternatively, Wi-Fi transceiver 132 may be an access point 134 (i.e., access point 134 and Wi-Fi transceiver 132 may be combined.) Similarly, LTE transceivers 110 and 122 may be coupled to a cellular-telephone network 140 via an LTE base station 138 (such as an eNodeB).

Wi-Fi transceiver 132 may include a Wi-Fi processor 142 having a memory 144, a scheduler 146 and radios 148 for storing and scheduling packets for transmission in a licensed frequency band (such as 2.4 GHz) and/or the unlicensed frequency band (such as 5 GHz). While Wi-Fi transceiver 132 is illustrated as having one Wi-Fi processor, there may be multiple processors in Wi-Fi transceiver 132, such as different processors and queues for a 2.4 GHz radio 148-1 and a 5 GHz radio 148-2. More generally, there may be a processor and a radio (or interface circuit) for each of the frequency bands. Note that a frequency band may be a single range of frequencies or may include two or more, non-overlapping ranges of frequencies.

Furthermore, there may be a communication link 150 between multi-mode LTE transceiver 108 and Wi-Fi transceiver 132 for communicating messages. For example, communication link 150 may have a high data rate (such as a data rate greater than 100 Mbps) and/or a low latency (such as a latency less than 50 or 100 ns), which may allow rapid transitions between LTE transceiver 108 and Wi-Fi transceiver 132. In particular, multi-mode LTE transceiver 108 may request a time for transmitting one or more packets in the unlicensed frequency band to be reserved by Wi-Fi transceiver 132 based on a message from LTE processor 114 or LTE-U processor 124. In some embodiments, communication link 150 is a direct connection. However, in some embodiments other types of communication links are used, such as a local area network (LAN).

While FIG. 1 illustrates LTE processor 114 and LTE-U processor 124 as being separate components, in other embodiments they are combined into a single component. Moreover, radio 148-1 may include a power amplifier for IEEE 802.11n compatible communication in a 2.4 GHz frequency band (or band of frequencies) using 2×2 MIMO, and radio 148-2 may include a power amplifier for IEEE 802.11ac compatible communication in a 5 GHz frequency band (or band of frequencies) using 2×2 MIMO. However, a variety of different configurations of radios, antennas and communication protocols may be used in the communication technique. Thus, the communication technique may be used in conjunction with a variety of different combinations of communication protocols that share a frequency band using a co-operative scheduling mechanism. For example, the communication technique may be used with existing or future IEEE 802.11 communication protocols (such as IEEE 802.11ax), existing or future cellular-telephone communication protocols (such as a 4G/5G communication protocol), an LWA communication protocol, etc.

In FIG. 1, radio 148-1 may transmit and receive frames or packets in the 2.4 GHz licensed frequency band and radio 148-2 may transmit and receive frames or packets in the unlicensed 5 GHz frequency band. However, other unlicensed frequency bands may be used. In some embodiments, an LTE co-location filter may be included and coupled to either or both of radios 148, which may allow integration to reduce complexity and cost, and to reduce latency. Furthermore, radios 148 may be coupled to a set of adaptive antennas that can facilitate beamforming or adapting the antennas to the recipient location and orientation for uplink and downlink data traffic.

Similarly, radio 120 in multi-mode LTE transceiver 108 may include logic circuits (such as QCA logic circuits from Qualcomm, Inc. of San Diego, Calif.) for communication in the 2.6 GHz frequency band and a Wi-Fi co-location filter for uplink and downlink transmissions. Moreover, as noted previously, radio 130 in multi-mode LTE transceiver 108 may be used for downlink communication in the 5 GHz frequency band. Furthermore, radio 130 may be coupled to a set of adaptive antennas that can facilitate beamforming or adapting the antennas to the recipient location and orientation for uplink and/or downlink data traffic.

In some embodiments, system 100 includes fewer or additional components, one or more components are moved, and/or two or more components are combined into a single component. Thus, system 100 should be understood to be an illustrative embodiment of a system that implements the communication technique.

In the communication technique, if there is a frame or a packet to be communicated in the unlicensed frequency band via LTE-U transceiver 122, a request may be made to Wi-Fi transceiver 132 via communication link 150 to reserve a time. After receiving confirmation of a reserved time from scheduler 146, LTE-U processor 124 may transmit, via radio 130, the frame or the packet in the reserved time in the unlicensed frequency band. Then, confirmation that the frame or packet has been received may be received on the licensed frequency band by LTE processor 114 and radio 120. Stated differently, LTE-U processor 124 and radio 130 transmissions may be unidirectional, and in particular, LTE-U processor 124 and radio 130 may be used for transmissions in the unlicensed frequency band. Thus, LTE-U processor 124 and radio 130 may not receive frames or packets in the unlicensed frequency band. Instead, LTE processor 114 and radio 120 may receive confirmation on the licensed frequency band. Consequently, LTE-U processor 124 and radio 130 may transmit only in the unlicensed frequency band, while LTE processor 114 and radio 120 may transmit and receive in the licensed frequency band. Note that Wi-Fi transceiver 132 may operate in both the licensed and the unlicensed frequency bands, and may transmit and receive frames or packets in the unlicensed frequency band.

Figure 2:
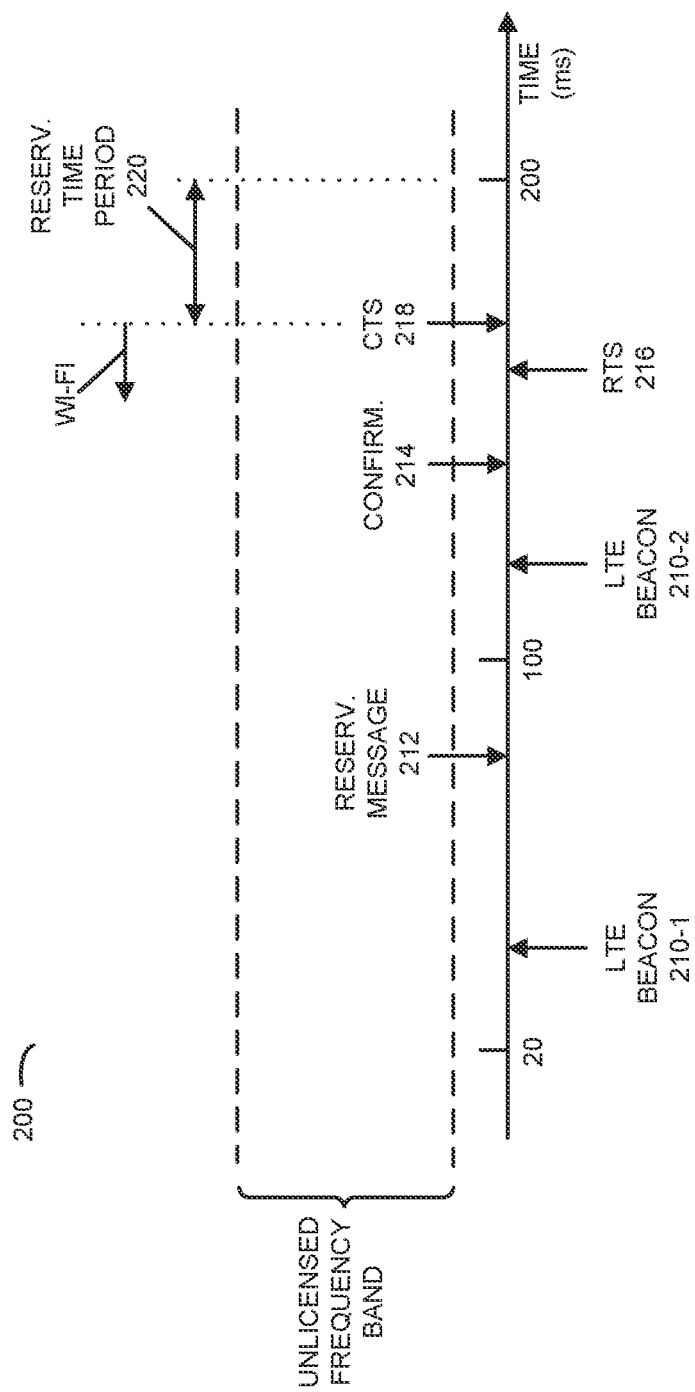
FIG. 2 provides a timing diagram illustrating Wi-Fi and LTE communication in accordance with some embodiments.

FIG. 2 presents an example of a timing diagram 200 of communication in the licensed and the unlicensed frequency bands and message exchanged via the communication link in accordance with some embodiments. In particular, while in a monitoring or standby mode, Wi-Fi transceiver 132 may initiate scanning for LTE-U system information blocks (SIBs) in LTE beacons 210 in the licensed frequency band. Using energy detection mechanisms, Wi-Fi transceiver 132 may determine that SIBs are interfering with the Wi-Fi communication. Moreover, approximately 20 ms into a time period, Wi-Fi transceiver 132 may detect the LTE-U SIBs interference. Subsequently, scheduler 128 may transmit a reservation message 212 (e.g., when needed, note that scheduler 128 may independently determine to request a time reservation). In some embodiments, because scheduler 128 may transmit a time reservation every 30 ms, reservation message 212 may be transmitted at time intervals of 30 ms, 60 ms, or 90 ms in the initial 100 ms time period. Consequently, scheduler 128 may, in each time interval, transmit a reservation message to scheduler 146 for the next 30 ms reservation period.

In an exemplary embodiment, scheduler 128 transmits, in each time interval, a reservation message to scheduler 146 for the next 30 ms reservation period. Thus, if multi-mode LTE transceiver 108 transmits SiB control/sync information in time intervals of 80 ms, such the subsequent SiB may be at 160 ms, 240 ms, 320 ms, etc. Because scheduler 128 may perform a quality-of-service (QoS) check of the queued data, note that scheduler 128 can also perform a look ahead-reservation.

Moreover, during each of the subsequent 30 ms time intervals, scheduler 128 may transmit a reservation message scheduler 146 to reserve space or a time for the next 30 ms reservation period. Therefore, in a singular time period of 100 ms, scheduler 128 can transmit up to three reservation messages for 30 ms reservation periods. Note that the 30 ms reservation period requested may be set to a variable time period with a minimum bound to lower overheads of the data traffic with the interrupt latency and with an upper bound of 80 ms with higher overheads of data traffic with the interrupt latency. Moreover, the upper bound of 80 ms may be set based on the time interval between SiBs of 80 ms, and may also indicate there is no reservation time required in the time period.

Reservation message 212 may be transmitted over communication link 150. When a reservation message is received by Wi-Fi transceiver 132, Wi-Fi frames and packets may be buffered for the following 30 ms reservation period in order to prevent collisions between LTE transceiver 122 and Wi-Fi transceiver 132. Moreover, scheduler 146 may buffer the frames and packets locally in memory 144 for the 30 ms reservation period based on the instructions from scheduler 146.

Furthermore, Wi-Fi transceiver 132 may transmit a confirmation 214 for the reservation request to multi-mode LTE transceiver 108 using communication link 150 in order to enable limited time latency to occur in the back and forth (i.e., reservation message 212 with the time request and confirmation 214 of the time request) between multi-mode LTE transceiver 108 and Wi-Fi transceiver 132. Wi-Fi transceiver 132 may continue to transmit frames or packets until reservation message 212 is confirmed. Once reservation message 212 is confirmed, Wi-Fi transceiver 132 may transmit a request-to-send (RTS) message 216 to a station with the lowest received signal strength indicator (RSSI) or a clear-to-send (CTS)-to-self frame 218 (which effectively is a multi-cast transmission that can be received by multiple devices). By transmitting RTS message 216 to the furthest station, hidden node problems such as transmission interference may be reduced or avoided. This is because a CTS-to-self frame may not entirely solve the hidden-node transmission interference problem. Note that the duration field specified in RTS message 216 or CTS-to-self field 218 may be the same as the duration of transmissions by LTE transceiver 122.

After receiving reservation message 212 with the time request, Wi-Fi transceiver 132 may send an RTS packet signal. In this way, Wi-Fi transceiver 132 may act as a node A wanting to send a packet to node B. Stated differently, Wi-Fi transceiver 132 may initially send RTS message 216. Moreover, after receiving RTS message 216, node B may respond with CTS message 218. Furthermore, after receiving CTS message 218, Wi-Fi transceiver 132 may send a confirmation 214 to multi-mode LTE transceiver 108 that the time period is available. (Thus, in some embodiments, confirmation 214 occurs after CTS message 218.)

Consequently, once CTS message 218 is received, Wi-Fi traffic transmissions may be stopped or shut-off in the allotted time period. Stated differently, corruptions in the unlicensed frequency band because of Wi-Fi traffic transmissions may be prevented by shutting off the Wi-Fi transmissions in a reserved time period 220. In FIG. 2, the shutoff or reserved time period 220 is between CTS message 218 and the 200 ms period marker. Note that any node that hears an RTS or CTS message may be prohibited from transmitting for a time period that is encoded in the duration field of the received RTS or CTS message. Moreover, the duration fields in RTS and CTS messages may be set such that nodes may be able to complete their communication within the prohibited time period. In some embodiments, the duration field quiet time period in the RTS message is programmable up to 32 ms and is encoded in a 16-bit frame or packet, i.e., LTE-U transmission in the communication technique may be limited to chunks of 32 ms transmissions.

Figure 3:
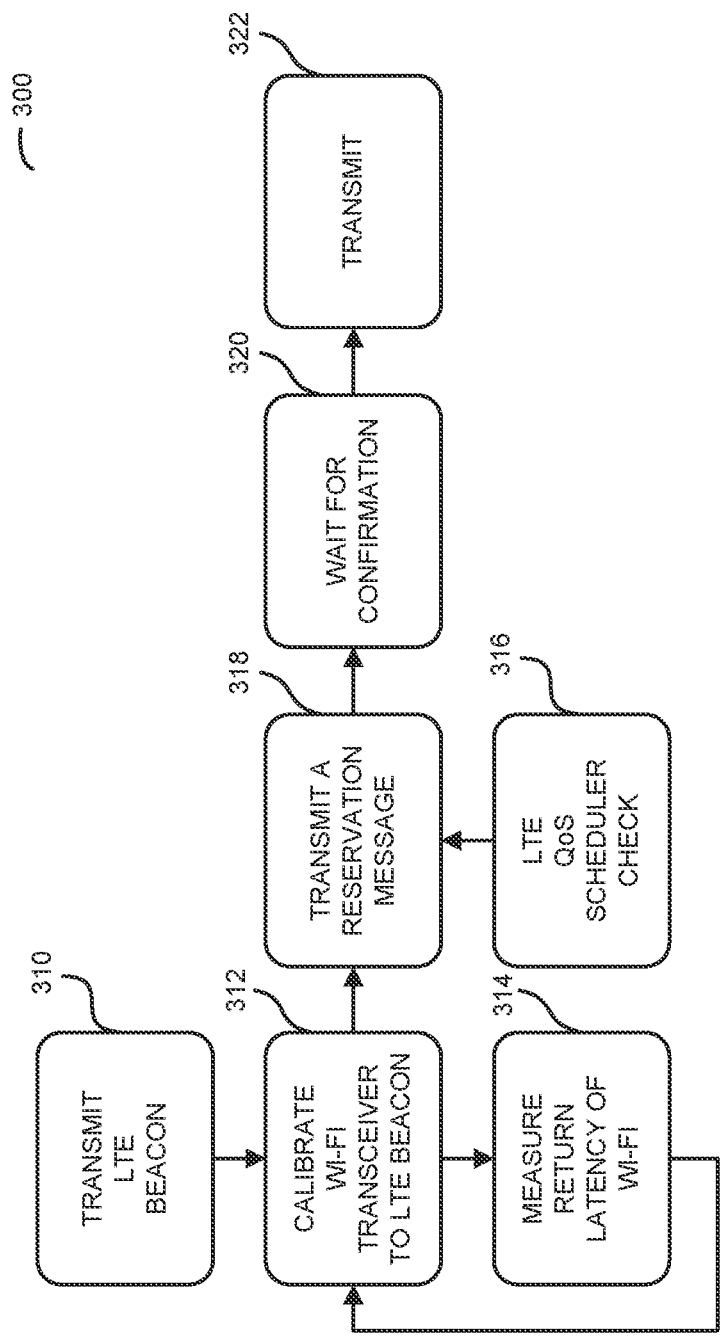
FIG. 3 provides a state diagram illustrating Wi-Fi and LTE communication in accordance with some embodiments.

FIG. 3 presents an illustrative example of a state diagram 300 that illustrates the Wi-Fi and LTE communication in accordance with some embodiments. In FIG. 3, Wi-Fi transceiver 132 may communicate directly with multi-mode LTE transceiver 108 and may receive SiB data in LTE beacons from LTE base station 138. Note that the LTE beacons with the SiBs may be transmitted in the licensed frequency band.

In FIG. 3, the LTE base station may transmit the SiB data in LTE beacons at fixed intervals 310. These fixed intervals define a periodicity of the LTE packet transmissions and the granularity of scheduling the frames by the LTE-U processor. Then, the Wi-Fi transceiver may calibrate 312 synchronizing to the LTE periodicity by the transmissions of the LTE beacons and may determine the latency of the RTS messages 314 by measuring the latency of the RTS and the CTS messages to the intermittent LTE beacons with the SiB data. The calibration (which may determine an offset between the Wi-Fi packet transmission in the unlicensed frequency band and the LTE transmission in the licensed frequency band) may be needed to account for delays in signaling channel RTS request-grant cycles between the Wi-Fi transceiver and the multi-mode LTE transceiver. These delays may be accounted for prior to transmission in order to ensure proper synchronization of the Wi-Fi transceiver and LTE packet transmissions. Note that the calibration may measure the time taken for the request-confirm process. Once this delay is known i.e., once the RTS is sent by the Wi-Fi transceiver, a confirmation message may be sent to the LTE-U processor. If the LTE-U processor is aware of the time delay in sending the message from one processor to another, it can schedule the LTE-U communication in advance.

The LTE frames or packets may be prioritized for transmitting in accordance with the traffic type by the local schedulers of the LTE-U and the LTE processors. As an example, the LTE scheduler may allow certain types of traffic to be isolated from all other traffic (such as Voice Over Internet Protocol or VoIP traffic from a file transfer protocol or FTP download). In this way, the LTE scheduler may arbitrate based on different types or classes of traffic. In some embodiments, the LTE scheduler may use a Traffic Flow Template (TFT) to define which traffic, based on source/destination Internet Protocol addresses and Transmission Control Protocol/User Datagram Protocol ports, should be given higher priority. Moreover, a QoS check may be performed by the LTE-U scheduler 316 using, e.g., the TFT classifications on the queued traffic data waiting in the memory of the LTE-U transceiver to be egressed.

In addition, the traffic data may also be buffered by the memory of the LTE-U transceiver based on the classification. After the LTE-U scheduler confirms the packet-data frames for transmission, the multi-mode LTE transceiver may send a reservation message with a time request to the Wi-Fi transceiver. Note that the LTE protocol standardization may allow control/synchronization information to be transmitted every 80 ms. Moreover, the LTE schedulers may also perform a look ahead-reservation request. In some embodiments, every 30 ms, the LTE schedulers transmit a reservation message 318 to the Wi-Fi transceiver for the next 30 ms reservation period. The 30 ms period may be variable with a minimum bound set to lower the overheads of message passing and the interrupt latency set to an upper bound of 80 ms, i.e., no reservation required.

This reservation message may be transmitted over the communication link between the Wi-Fi transceiver and the multi-mode LTE transceiver. After receiving the reservation message, the processor of the Wi-Fi transceiver may ensure that packets are buffered in memory for the following or next 30 ms period, so there are no transmissions during the reserved time. Prior to transmitting 322, the multi-mode LTE transceiver may wait for confirmation 320 from the Wi-Fi transceiver via the communication link. Note that the requests for reservations from the multi-mode LTE transceiver may also occur on the control channel, which is in a licensed frequency band. In these embodiments, the schedule for packet-data transmissions from the LTE-U transceiver may be sent on the control channel (via the licensed frequency band) and not on the unlicensed frequency band.

The implication of this reservation mechanism is that the Wi-Fi and the LTE communication may need to be time synchronized. However, this may not be necessary if the LTE-U scheduler is able to calibrate the latency of messages passing between the Wi-Fi transceiver and the multi-mode LTE transceiver.

In some embodiments, the reservation mechanism is sent from the Wi-Fi transceiver to the multi-mode LTE transceiver. For example, the scheduler in the Wi-Fi transceiver may send an indication to the multi-mode LTE transceiver indicating whether there are any packets scheduled for transmission, and if yes it may forward a reservation confirmation to the multi-mode LTE transceiver confirming a reservation. In this implementation, the multi-mode LTE transceiver may not send a reservation request to the Wi-Fi transceiver because the Wi-Fi transceiver may be responsible for both the reservation requests and allocating space in the shared unlicensed frequency band. Thus, in some embodiments the reservation requests from the LTE transceiver are optional.

Figure 4:
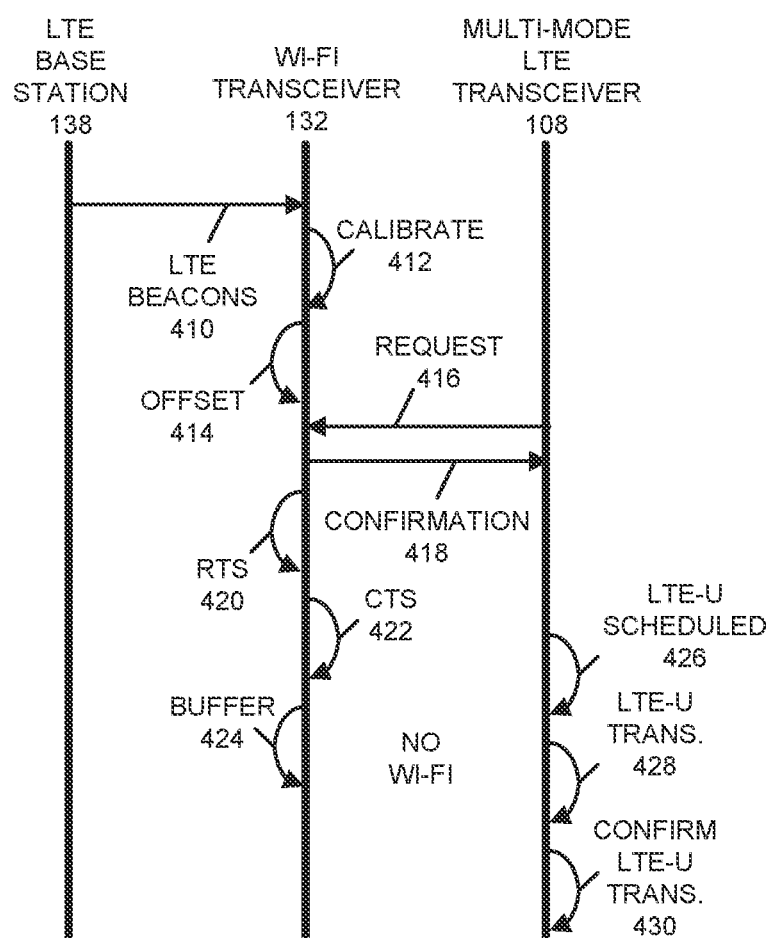
FIG. 4 provides an illustration of communication among electronic devices in the system of FIG. 1 in accordance with some embodiments.

FIG. 4 presents a diagram illustrating an example of communication among electronic device in system 100 FIG. 1 in accordance with some embodiments. In FIG. 4, while in a monitoring or standby mode, Wi-Fi transceiver 132 may initiate scanning for the SiB data in LTE beacons from LTE base station 138 (such as an eNodeB). LTE base station 138 may transmits LTE beacons 410 with SiB control/synchronization information in intervals of 80 ms. Then, Wi-Fi transceiver 132 may calibrate 412 the periodicity with the LTE transmission by generating an offset 414. (In this way, the reserved time may be matched to the LTE transmissions.) Next, scheduler 128 (FIG. 1) in multi-mode LTE transceiver 108 may transmits a request for a reservation 416. Note that scheduler 128 may transmit a reservation every 30 ms, so the request may be transmitted at intervals of 30 ms, 60 ms, or 90 ms. Moreover, scheduler 128 may transmit in each time interval a reservation message to scheduler 146 (FIG. 1) in Wi-Fi transceiver 132 for the next 30 ms reservation period.

Wi-Fi transceiver 132 may confirm 418 the reservation request 416 and Wi-Fi transmissions may be shut-off or prevented in the reserved time or space by generating or providing an RTS message 420. Next, Wi-Fi transceiver 132 may receive confirmation via a CTS message 422 and may buffer 424 in memory the packet data during the reserved time. In general, upon receiving the reservation message with the time request, Wi-Fi transceiver 132 may send the RTS message. Moreover, upon receiving the RTS message 420, a node may send a response with the CTS message 422. Once the request is confirmed, scheduler 128 may perform a QoS check on the queued packet data and may schedule 426 downlink transmissions 428 of the packet data by the LTE-U transceiver in the unlicensed frequency band. Furthermore, confirmation 430 of the LTE-U transmission may be sent uplink to the LTE transceiver via the licensed frequency band.

Figure 5:
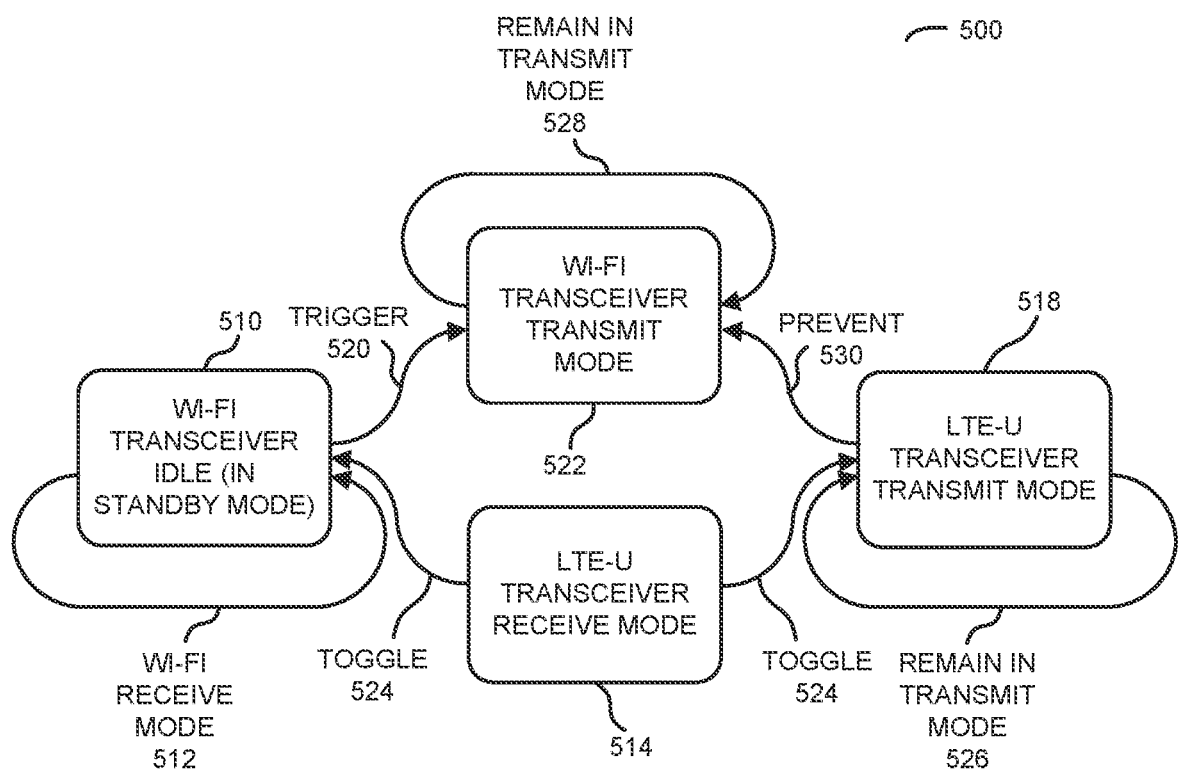
FIG. 5 provides a state diagram illustrating modes in Wi-Fi and LTE communication in accordance with some embodiments.

FIG. 5 presents an illustrative example of a state diagram 500 of the modes of the Wi-Fi and LTE communication in accordance with some embodiments. Initially, the Wi-Fi transceiver may be in a standby or default mode 510. During this mode, the Wi-Fi transceiver may be in a receive mode 512. Because the Wi-Fi transceiver may confirm the reservation request of the multi-mode LTE transceiver, the LTE-U transceiver may either be programmed to be toggled to transmit mode at the time the LTE-U transceiver transmits or may be triggered from a receive mode 514 into a transmit mode 518 by the multi-mode LTE transceiver. Moreover, if the Wi-Fi transceiver is programmed to change to the transmit mode, the Wi-Fi transceiver may be programmed to stay in transmit mode for a period of time. This period of time may be the reserved time requested. Consequently, just prior to LTE-U transceiver transmitting traffic data, the Wi-Fi transceiver may be programmed to be placed in a transmit mode that prevents the Wi-Fi transceiver from being saturated, as would be the case if the Wi-Fi transceiver was in the default receive mode when the LTE-U transceiver transmitted.

Alternatively, if the Wi-Fi transceiver is triggered into transmit mode, the LTE transmitter may send an activation signal to the Wi-Fi transceiver triggering 520 the Wi-Fi transceiver and placing the Wi-Fi transceiver into a transmit mode 522. Thus, upon receiving notice by the multi-mode LTE transceiver to transmit, the LTE-U transceiver, before transmitting in the unlicensed frequency band, may send a notification to the Wi-Fi transceiver to toggle 524 the mode of the Wi-Fi transceiver from a non-transmit state to a transmit state. The toggle notification may be sent to the Wi-Fi transceiver via the communication link. Consequently, just before the LTE-U transceiver transmits traffic data, the Wi-Fi transceiver may be placed in a transmit mode to prevent the Wi-Fi transceiver from being saturated by the LTE-U transmission as would be the case if it were in a default receive mode.

In other words, the Wi-Fi transceiver may saturate because of sensitive front-end components used in the receive mode, such as low noise amplifiers. In order to protect these sensitive components from damage and to prevent the receiver components in the Wi-Fi transceiver from being saturated by the LTE-U transceiver transmission, the LTE-U transceiver may stay or remain in transmit mode 526 and the Wi-Fi transceiver may stay in transmit mode 528.

After the LTE-U transceiver completes the transmission in the licensed frequency band, the Wi-Fi Transceiver may be programmed or may be notified to revert back to receive mode 512. Therefore, in both examples the Wi-Fi transceiver may be kept in transmit mode throughout operation when the LTE-U transceiver is in the transmit mode and may not be allowed to revert to a default state of a receive mode. For example, the LTE-U transceiver may prevent 530 the Wi-Fi transceiver from toggling back to receive mode 512.

Figure 6:
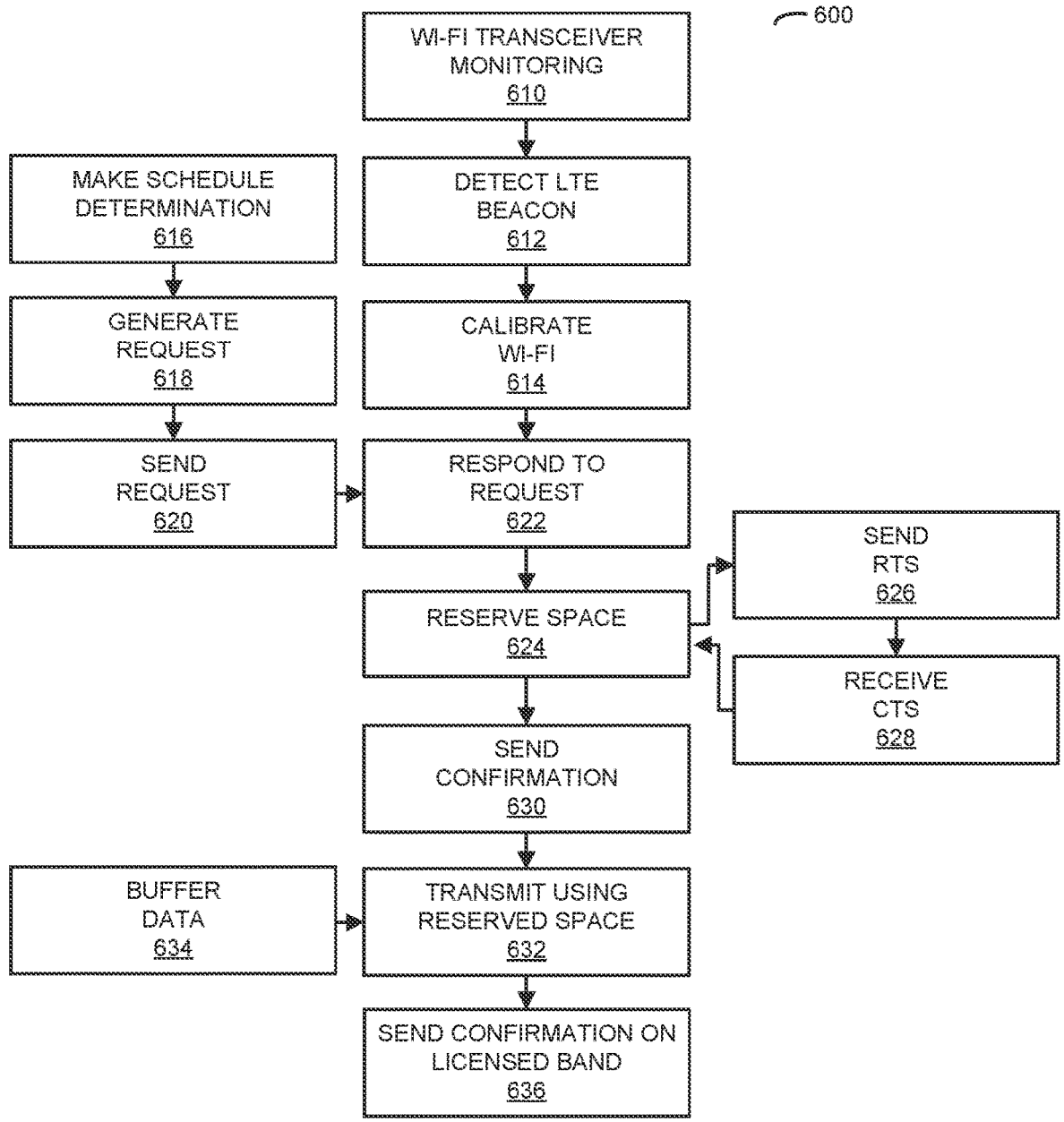
FIG. 6 provides a flowchart illustrating a method for transmitting traffic in a wireless network in accordance with some embodiments.

FIG. 6 presents a flowchart 600 illustrating an example of operation of the Wi-Fi transceiver and the multi-mode LTE transceiver in accordance with some embodiments. In particular, while in a monitoring 610 or standby mode, the Wi-Fi transceiver may initiate scanning for the SiB data in the LTE beacon. With reference to the example in FIG. 2, at approximately 20 ms into a time period, the Wi-Fi transceiver may detect 612 the SiB signals in the licensed frequency band. Note that the LTE base station may transmit SiB control/synchronization information in intervals of 80 ms.

Moreover, the Wi-Fi transceiver may be calibrated 614 based on the control/synchronization information by generating an offset. The scheduler of the Wi-Fi transceiver may respond 622 to a request 620 sent to the Wi-Fi transceiver by the LTE-U transceiver, which receives scheduling information from the eNobeB 616 and then generates the request 618. Note that the Wi-Fi transceiver and the multi-mode LTE transceiver may exchange messages via the communication link. Furthermore, the LTE schedulers may transmit, in each time interval, a reservation message to the Wi-Fi scheduler for the next 30 ms reservation period. Note that the schedulers may perform a QoS check of the queued packet data for a look ahead-reservation.

During each of the subsequent 30 ms intervals, the LTE schedulers may transmit a reservation message to the Wi-Fi transceiver to reserve space for the next 30 ms reservation period. Thus, in a single period of 100 ms, the LTE schedulers may transmit up to three reservation messages for 30 ms periods. The 30 ms period reservation requested may be set to a variable period with a minimum bound based on lower overheads of data traffic with an interrupt latency and with an upper bound of 80 ms with higher overheads of data traffic with an interrupt latency. In addition, the upper bound of 80 ms may be set based on the interval between SiB data in the LTE beacons of 80 ms and may also indicate there is no reservation required in the time period.

The reservation message may be transmitted over a communication link between the Wi-Fi transceiver and the multi-mode LTE transceiver. After receiving the reservation message 622, the Wi-Fi transceiver may ensure that frames or packets are buffered for the following 30 ms period. The Wi-Fi receiver may transmit the confirmation of the reservation request via the communication link to enable limited time latency occurring in the back-and-forth communication.

In particular, after receiving the reservation message with the time request, the Wi-Fi transceiver may reserve space 624. For example, the Wi-Fi transceiver may send an RTS message 626. Then, after receiving the CTS message 628, the Wi-Fi transceiver may send a confirmation 630 to the multi-mode LTE transceiver that the time period is available. Therefore, after the CTS message has been received, the Wi-Fi transmissions may be shut-off in the allotted time period. Note that any node that hears an RTS or a CTS message may be prohibited from transmitting for a period that is encoded in the duration field of the RTS or the CTS message. As noted previously, the duration fields in RTS and CTS messages may be set such that nodes are able to complete their communication outside the prohibited period. In some embodiments, the RTS duration period is programmable up to 500 ms and encoded in a 16 bit data packet.

Additionally, the LTE-U transceiver may transmit 632 during the reserved period in the unlicensed frequency band and may send a confirmation in the licensed frequency band 636. Note that the Wi-Fi transceiver may buffer data 634 during the LTE-U transmission.

In some embodiments, FIG. 6 includes fewer or additional operations, an order of the operations is changed and/or two or more operations are combined into a single operation.

Figure 7:
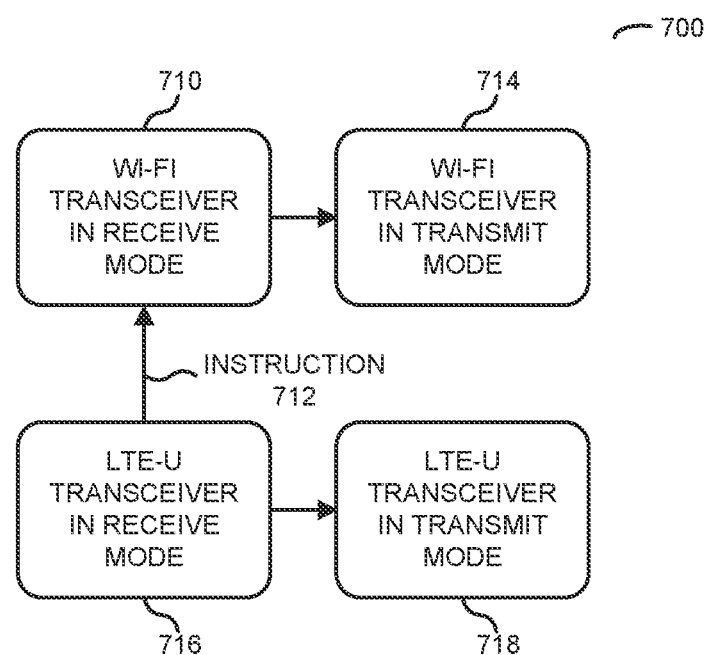
FIG. 7 provides a flow diagram illustrating Wi-Fi and LTE communication in accordance with some embodiments.

FIG. 7 is a flow diagram 700 illustrating an example of operation of the Wi-Fi and LTE transceivers in accordance with some embodiments. In particular, the Wi-Fi transceiver may be placed in a default state 710, e.g., the Wi-Fi transceiver may be in a 'receive' mode. When in the 'receive' mode, the Wi-Fi transceiver components may be subject to saturation from high-power signals, such as from the LTE-U transmitter. Therefore, before the LTE-U transceiver switches from the receive mode 716 to the transmit mode 718 and transmits, the Wi-Fi transceiver may be instructed 712 to switch to a transmit mode 714. The switch by the Wi-Fi transceiver to a transmit mode may be programmed when the Wi-Fi transceiver confirms the reservation request from the multi-mode LTE transceiver or when the Wi-Fi transceiver generates the RTS message. Alternatively, the multi-mode LTE transceiver may notify the Wi-Fi transceiver to switch states prior to a transmission. In these embodiments, the Wi-Fi transceiver is placed in the transmit mode 714 when the LTE-U transceiver transmits in the transmit mode 718. In this way, the receiver in the Wi-Fi transceiver may not be exposed to a higher power transmission signal of the LTE-U transceiver in the unlicensed frequency band and components (such as low noise amplifiers) in the receiver may not be damaged by signal saturation. Note that the Wi-Fi transceiver may be kept in the transmit mode 714 until the LTE-U transceiver has completed transmitting in the unlicensed frequency band. By placing the transmitters of the Wi-Fi transceiver and the LTE-U transceiver in the transmit modes at the same time, the signal-to-noise ratio of the LTE-U transmitter may be maintained without additional protection filters being needed in the receiver in the Wi-Fi transceiver.

The Wi-Fi transceiver and the multi-mode LTE transceiver can be (or can be included in) one or more electronic devices with at least one network interface. For example, the Wi-Fi transceiver and the multi-mode LTE transceiver can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, an access point, a controller, test equipment, and/or another electronic device.

Although specific components are used to describe the Wi-Fi transceiver and the multi-mode LTE transceiver, in alternative embodiments, different components and/or subsystems may be present in the Wi-Fi transceiver and the multi-mode LTE transceiver. For example, the Wi-Fi transceiver and/or the multi-mode LTE transceiver may include one or more additional components or one or more fewer components. Also, in some embodiments some or all of a given subsystem or component can be integrated into one or more of the other subsystems or component(s) in the Wi-Fi transceiver and/or the multi-mode LTE transceiver. For example, at least some of the aforementioned operations may be implemented in a media access control (MAC) layer and may be performed by an interface circuit (such as one or more of the Wi-Fi and/or LTE transceivers).

An integrated circuit (which is sometimes referred to as a 'communication circuit') may implement some or all of the functionality of the Wi-Fi transceiver and/or the multi-mode LTE transceiver. In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

It some embodiments, the Wi-Fi transceiver and/or the multi-mode LTE transceiver are implemented as application specific integrated circuits (ASIC), application-specific standard parts (ASSPs), System-on-Chip (SoC), field-programmable gate arrays (FPGAs), etc. Further, it will be appreciated that the Wi-Fi transceiver and/or the multi-mode LTE transceiver may include various other functions and components that are well known in the art.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A system, comprising:
   a first transceiver configured to use a first channel-access technique; and
   a second transceiver configured to use a second channel-access technique that is different from the first channel-access technique, wherein the system is configured to transmit traffic in a shared frequency band using the first transceiver and the second transceiver without mutual interference by selectively preventing transmitting of a first type of traffic in the shared frequency band when the second transceiver is scheduled to transmit a second type of traffic in the shared frequency band, wherein the selective preventing comprises:
      providing, addressed to a second electronic device, a request-to-send (RTS) packet, wherein an RTS period duration is programmable; and
      receiving, associated with the second electronic device and after providing the RTS packet, a clear-to-send (CTS) packet.

2. The system of claim 1, wherein the first channel-access technique comprises a contention-based channel-access communication protocol and the second channel-access technique comprises a schedule-based channel-access communication protocol.

3. The system of claim 1, wherein the shared frequency band is unlicensed.

4. The system of claim 1, wherein the first type of traffic is compatible with an Institute of Electrical and Electronics Engineers (IEEE) 802.11 communication protocol and the second type of traffic is compatible with a cellular-telephone data communication protocol.

5. The system of claim 4, wherein the cellular-telephone data communication protocol is compatible with Long Term Evolution (LTE).

6. The system of claim 1, wherein the first transceiver is configured to schedule the transmitting by the second transceiver in response to a request from the second transceiver.

7. The system of claim 6, wherein the first transceiver is configured to permit the transmitting by the second transceiver during the scheduled transmitting.

8. The system of claim 6, wherein the scheduling of the transmitting by the second transceiver keeps an inter-frame space in the first type of traffic from causing the second transceiver to incorrectly determine that the shared frequency band is idle.

9. The system of claim 1, wherein the first transceiver provides the CTS packet prior to scheduling the transmitting by the second transceiver.

10. The system of claim 1, wherein the system is configured to receive a system information block (SiB) of data comprising timing of transmitting of the second type of traffic.

11. The system of claim 10, wherein the system is configured to generate, based at least in part on the received SiB data, an offset in time of a periodicity of transmissions of the first type of traffic and the second type of traffic.

12. The system of claim 11, wherein the system is configured to synchronize, using the generated offset, the periodicity of transmitting of the first type of traffic and the second type of traffic.

13. The system of claim 12, wherein the system is configured to perform synchronized transmitting of the first type of traffic and the second type of traffic in the shared frequency band.

14. The system of claim 1, wherein the second transceiver is configured to receive, associated with a third electronic device and after the transmitting of the second type traffic in the shared frequency band, a confirmation in a licensed frequency band that the second type of traffic was received.

15. The system of claim 1, wherein the second transceiver is configured to classify the second type of traffic based at least in part on a quality of service check of data in a packet in the second type of traffic.

16. The system of claim 14, wherein the second transceiver is configured to prioritize the second type of traffic for transmission based at least in part on the classification; and
wherein a classification of Voice over Long Term Evolution (VoLTE) traffic has a higher priority than other classifications.

17. A non-transitory computer-readable storage medium for use in conjunction with a system, the computer-readable storage medium comprising program instructions, wherein, when executed by the system, the program instructions cause the system to transmit traffic in a shared frequency band by performing operations comprising:
transmitting the traffic in the shared frequency band using a first transceiver that uses a first channel-access technique and a second transceiver that uses a second channel-access technique that is different from the first channel-access technique;
avoiding mutual interference in the shared frequency band by selectively preventing transmitting of a first type of traffic in the shared frequency band when the second transceiver is scheduled to transmit a second type of traffic in the shared frequency band, wherein the selective preventing comprises:
providing, addressed to a second electronic device, a request-to-send (RTS) packet, wherein an RTS period duration is programmable; and
receiving, associated with the second electronic device and after providing the RTS packet, a clear-to-send (CTS) packet.

18. The non-transitory computer-readable storage medium of claim 17, wherein the first channel-access technique comprises a contention-based channel-access communication protocol and the second channel-access technique comprises a schedule-based channel-access communication protocol.

19. A method for transmitting traffic in a shared frequency band, comprising:
by a system:
transmitting the traffic in the shared frequency band using a first transceiver that uses a first channel-access technique and a second transceiver that uses a second channel-access technique that is different from the first channel-access technique;
avoiding mutual interference in the shared frequency band by selectively preventing transmitting of a first type of traffic in the shared frequency band when the second transceiver is scheduled to transmit a second type of traffic in the shared frequency band, wherein the selective preventing comprises:
providing, addressed to a second electronic device, a request-to-send (RTS) packet, wherein an RTS period duration is programmable; and
receiving, associated with the second electronic device and after providing the RTS packet, a clear-to-send (CTS) packet.

20. The method of claim 19, wherein the first channel-access technique comprises a contention-based channel-access communication protocol and the second channel-access technique comprises a schedule-based channel-access communication protocol.

* * * * *